Patented May 17, 1927.

1,629,194

UNITED STATES PATENT OFFICE.

ALOIS ZINKE AND ALBERT KLINGLER, OF GRAZ, AUSTRIA, ASSIGNORS, BY MESNE ASSIGNMENTS, TO FELICE BENSA.

PROCESS FOR MANUFACTURING DIHYDROXY PERYLENE.

No Drawing.     Application filed October 4, 1922. Serial No. 592,203.

This invention relates to certain improvements in the manufacture of dihydroxyperylene and has for its object to simplify and cheapen such manufacture.

In a prior application Serial No. 568289 June 14, 1922, of Series of 1915, a process for manufacturing dihydroxyperylene ($C_{10}H_{12}O_{12}$) is described which consists in intimately mixing alkylated dioxybinaphthyls with ring closing condensing agents such as chloride of aluminium and heating the mixture to a temperature below the melting or softening temperature of the dihydroxyperylene, whereupon the condensing agent together with its products of decomposition are removed by lixiviation. Now it has been found that in lieu of the alkylated dioxybinaphthyls the dioxybinaphthyls themselves which are known on the market also as dinaphthols, may be used. When intimately mixed with ring closing condensing agents and heated for a period of time from one quarter of an hour to one hour to a temperature below the melting temperature of the dinaphthols they directly give dihydroxyperylene, the output being very satisfactory. Preferably some basic substances are added to the mixture before heating such as alkali or alkali earth metal hydroxides or carbonates. More particularly carbonates are advantageous inasmuch as the mass is loosened, and the active surface is increased by the carbon dioxide set free, whereby the reaction is promoted and the agitation or stirring of the mass is rendered possible or facilitated.

The following is an example of carrying into practice the present improved process.

Forty parts by weight of commercial β dinaphthol are intimately mixed with 40 parts by weight of anhydrous soda and 300 parts by weight of anhydrous aluminium chloride and the mixture is heated for a period of time not exceeding half an hour to a temperature not exceeding 170° centigrade. The mass thus obtained is boiled with dilute hydrochloride acid and the residue resulting after washing consists mainly of dihydroxyperylene which may be purified as described in the said prior application, or may be directly utilized for manufacturing perylene by the method described in the prior application Serial No. 568289 June 14, 1922.

The present improved process offers the advantage that by using the commercial dinaphthol instead of alkylated dioxybinaphthyls there is secured a material simplification of the process and at the same time a large reduction of the costs of manufacture of dihydroxyperylene.

We claim:

1. A process for manufacturing dihydroxyperylene consisting in intimately mixing dinaphthols with aluminum chloride, heating the mixture for a period of time not exceeding one hour to a temperature not exceeding the melting temperature of the dinaphthols and lixiviating the mass obtained, whereby any undecomposed aluminum chloride and products of decomposition thereof are removed.

2. A process for manufacturing dihydroxyperylene consisting in intimately mixing dinaphthols with aluminum chloride and basic compounds of the alkali forming metals, heating the mixture for a period of time not exceeding one hour to a temperature not exceeding the melting temperature of the dinaphthols and lixiviating the mass obtained whereby any undecomposed aluminum chloride and such basic compounds and products of decomposition thereof are removed.

3. A process for manufacturing dihydroxyperylene, consisting in intimately mixing dinaphthols with aluminum chloride and carbonates of alkali forming metals, heating the mixture for a period of time not exceeding one hour to a temperature not exceeding the melting temperature of the dinaphthols and lixiviating the mass obtained, whereby any undecomposed aluminum chloride and such carbonates and products of decomposition thereof are removed.

In testimony whereof we signed our names to this specification at Vienna, this seventh day of September, 1922.

Dr. ALOIS ZINKE.
Dr. ALBERT KLINGLER.